United States Patent [19]

MacLennan

[11] Patent Number: 5,481,952
[45] Date of Patent: Jan. 9, 1996

[54] SLASHER SAW BLADE ASSEMBLY

[76] Inventor: Charles D. MacLennan, 153 Cote St-Charles, Hudson Heights, Quebec, Canada, J0P 1J0

[21] Appl. No.: 187,080

[22] Filed: Jan. 27, 1994

[51] Int. Cl.⁶ ............................................. B27B 33/08
[52] U.S. Cl. ................................. 83/839; 83/676
[58] Field of Search ................ 83/835–845, 855, 83/676

[56] References Cited

U.S. PATENT DOCUMENTS

| | | |
|---|---|---|
| 3,261,384 | 7/1966 | Henderson . |
| 3,818,561 | 6/1974 | Montana et al. ............. 83/836 X |
| 3,977,447 | 8/1976 | Pease . |
| 4,084,470 | 4/1978 | Reed . |
| 4,750,396 | 6/1988 | Gaddis et al. .................... 83/844 |
| 4,765,217 | 8/1988 | Ludwig . |
| 4,817,692 | 4/1989 | Denis . |
| 4,879,936 | 11/1989 | Anderson . |
| 4,932,447 | 6/1990 | Morin ............................. 83/839 X |
| 5,058,477 | 10/1991 | MacLennan ..................... 83/839 |
| 5,085,112 | 2/1992 | MacLennan ..................... 83/840 |
| 5,131,305 | 7/1992 | MacLennan ..................... 83/840 |
| 5,211,212 | 5/1993 | Carlson et al. ............... 83/839 X |
| 5,261,306 | 11/1993 | Morey et al. .................... 83/840 |

FOREIGN PATENT DOCUMENTS

| | | |
|---|---|---|
| 1266418 | 3/1990 | Canada . |
| 243178 | 12/1967 | U.S.S.R. ........................ 83/835 |

*Primary Examiner*—Rinaldi I. Rada
*Assistant Examiner*—Clark F. Dexter
*Attorney, Agent, or Firm*—Samuel Meerkreebs

[57] ABSTRACT

A replaceable cutting tooth for a slashing saw, wherein the tooth includes a pair of upper cutting tips with rearwardly divergent adjacent cutting edges and a pair of lower cutting tips also with rearwardly divergent adjacent pairs of cutting edges, such that each side surface and top surface are provided with shallow V-shaped cutting edges whereby the cutting tips protrude laterally and outwardly from the tooth. As the upper cutting tips wear, the lower cutting teeth will continue to maintain a satisfactory width of the kerf.

2 Claims, 2 Drawing Sheets

SLASHER SAW BLADE ASSEMBLY

BACKGROUND OF THE INVENTION

1. Field of the Invention

The present invention relates to an improved saw tooth for use with circular saws, and particularly for a slasher saw blade.

2. Description of the Prior Art

Slasher saws normally include a circular disc having slots into which replaceable teeth are inserted. Each replaceable tooth includes a shank which may be an elongated blade or a C-shaped blade, each insertable in a complementary slot defined in the circular disc. A tooth head is usually made of tungsten carbide and is brazed to the shank.

An example of such a saw tooth is illustrated in Canadian Patent 1,266,418, issued Mar. 6, 1990 to Andre M. Ludwig. In the Ludwig patent, each tooth head has a pair of front side edges and a recessed front surface (relative to the direction of rotation) defining a pair of cutting points with the top surface raking rearwardly and inwardly therefrom. The front side edges are divergent outwardly to the tips and eliminate the need to have left and right saw teeth tips. However, as the side edges wear, the kerf will narrow thus causing friction on the saw disc, thereby increasing the horsepower required to slash or otherwise cut through a log.

SUMMARY OF THE INVENTION

It is an aim of the present invention to provide an improved slasher tooth for a circular (i.e. slasher) saw blade, which has a longer life than the teeth in the prior art.

It is a further aim of the present invention to provide a slasher tooth for a circular saw in which the width of the kerf is maintained, thereby avoiding an increase in friction between the disc and the walls of the kerf even though the side edges extending from the cutting tips may be worn.

A construction in accordance with the present invention comprises a cutting tooth for a rotary saw blade, wherein the saw blade includes a circular disc, and the tooth comprises a shank extending radially from the periphery of the circular disc. A saw tooth head is fixed to the shank. The saw tooth head includes a front attack face or surface oriented in the direction of rotation of the rotary saw, a top surface, a pair of side surfaces and a bottom surface defining top, side, and bottom edges respectively with the front face. The side surfaces are divergent in the direction of rotation of the rotary saw. The front face is recessed with flat quadrant surfaces sloping from the center of the front face to the respective edges. The intersection of the top edge with the side edges forms a pair of spaced-apart upper cutting tips, the distance between which is greater than the width of the shank and the saw disc. The intersection of the side edges and the bottom edges define a pair of spaced-apart lower cutting tips, the distance between which is greater than the width of the shank and the disc. Each flat quadrant surface includes one of said tips selected from the pair of upper cutting tips and the pair of lower cutting tips. The quadrant surfaces include a pair of cutting edge portions extending from each respective cutting tip, and each cutting edge portion of said pair diverges rearwardly from the front face forming shallow V-shaped cutting edges between each pair of tips and the cutting edges being coincident with the side, top, and bottom edges respectively.

Thus, each tip forms a cutting protrusion extending forwardly and outwardly from the tooth. As a result of the outwardly diverging top and side flat surfaces intersecting the flat quadrant surfaces of the front face, the upper cutting tips and lower cutting tips extend forwardly and laterally beyond the remainder of the tooth. It is known from the Ludwig patent that cutting tips on the upper portion of the tooth head along with the divergent cutting edges will do most of the severing of the fibers to form the kerf. As a result of the distance between the pair of upper cutting tips being greater than the width of the disc and the tooth shank, the kerf is, therefore, of greater width than the rotary saw. However, it is the upper cutting tips and the respective pairs of divergent cutting edge portions which wear more rapidly than the other cutting edge portion of the tooth or the side surfaces of the shank and circular disc of the rotary saw. However, the lower cutting tips and their divergent cutting edge portions will continue to maintain a wide kerf beyond the average wearing time of the upper cutting tips. The upper cutting tips and the respective divergent cutting edge portion can continue to sever wood fibers forming the kerf while the lower cutting tips and the divergent cutting edge portions will widen the kerf formed by the upper cutting tips and their respective cutting edge portions. Thus, the life expectancy of the cutting teeth on the rotary saw are expected to be much greater than conventional teeth as represented by the Ludwig patent.

It is also contemplated that the saw tooth head can be rotated 180° in order to present the lower tips as the cutting tips.

BRIEF DESCRIPTION OF THE DRAWINGS

Having thus generally described the nature of the invention, reference will now be made to the accompanying drawings, showing by way of illustration, a preferred embodiment thereof, and in which.

DESCRIPTION OF THE PREFERRED EMBODIMENTS

Figure 1:
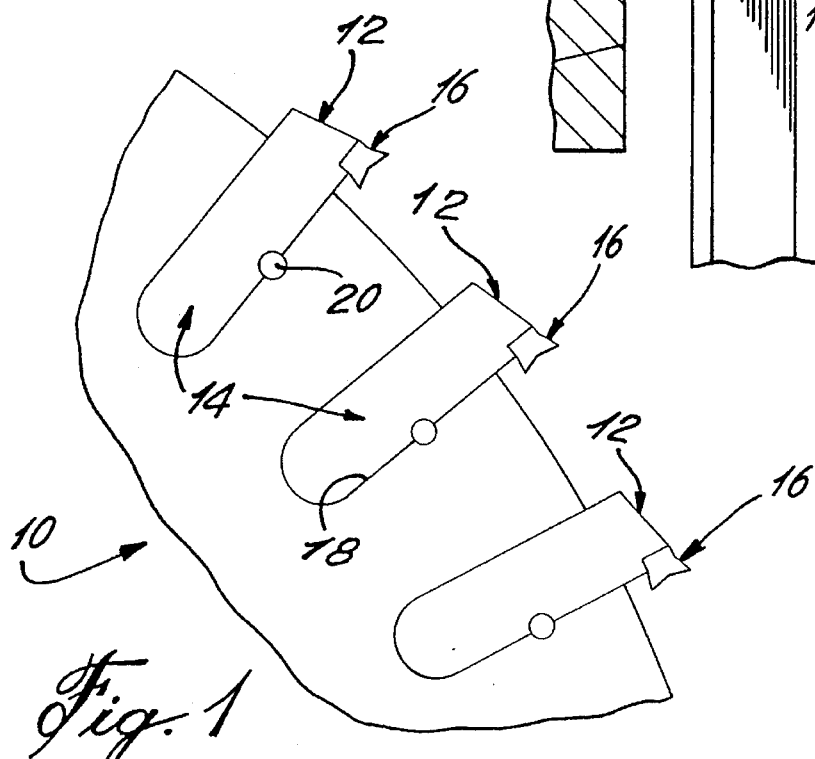
FIG. 1 is a fragmentary side elevation of a circular disc for a rotary saw including replacement teeth in accordance with the present invention.
Figure 2:
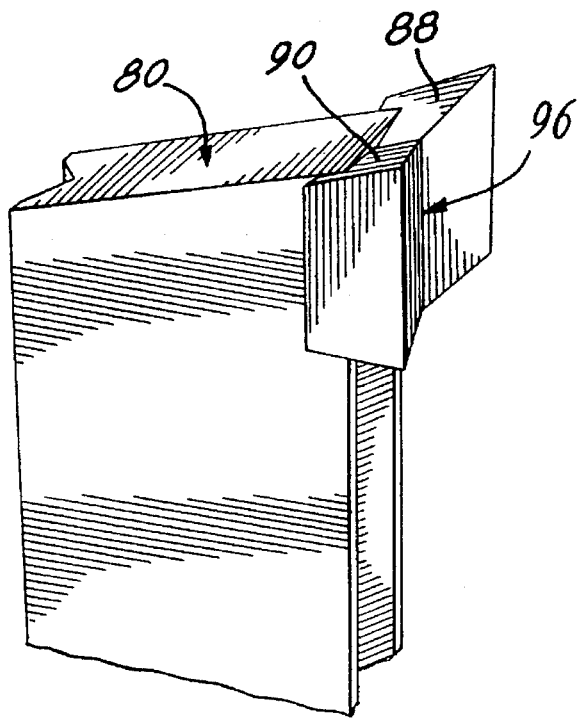
FIG. 2 is a fragmentary perspective view of a replacement tooth in accordance with the prior art.

Referring now to the drawings and in particular to FIG. 1, there is shown a rotary slasher saw including a circular disc 10 having a series of replaceable teeth 12. Each slasher tooth 12 has a shank 14 and a tooth head 16. The tooth 12, in the present embodiment, extends radially of the disc 10 and is replaceable on the disc. For instance, the shank 14 is maintained in a slot 18 in the disc 10 by means of a dowel 20. In this case, the shank is a straight blade, but in other embodiments as is well known, it may be C-shaped fitting within a recess which is in the form of a fragment of a circle. Such replaceable teeth are well known and are illustrated in Canadian Patent 1,266,418.

Figure 5:
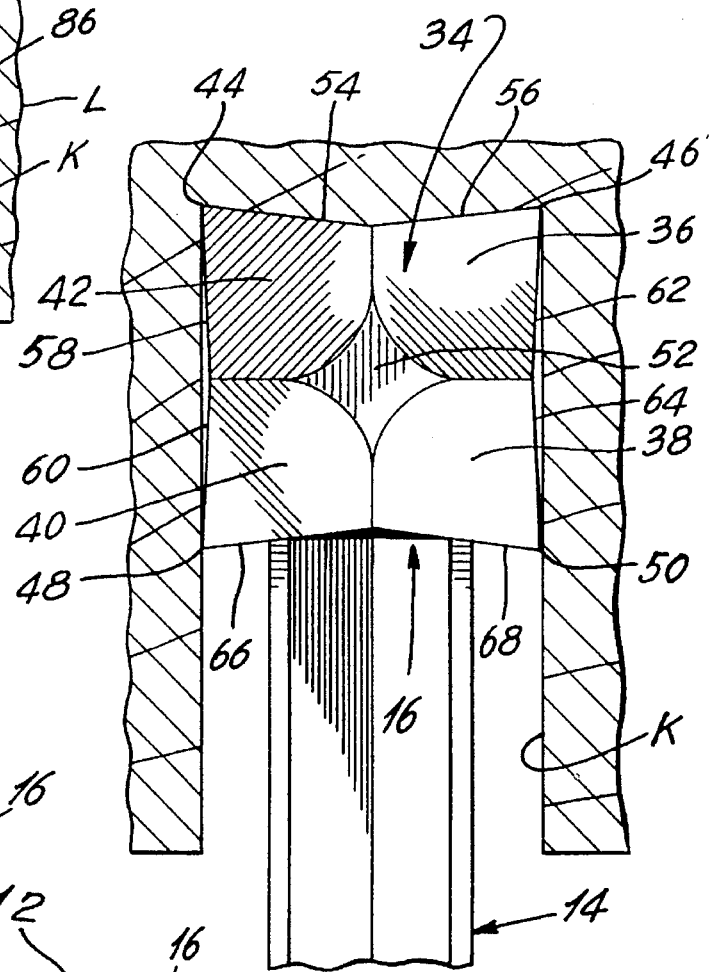
FIG. 5 is a front fragmentary elevation of a detail in accordance with the present invention.
Figure 3:
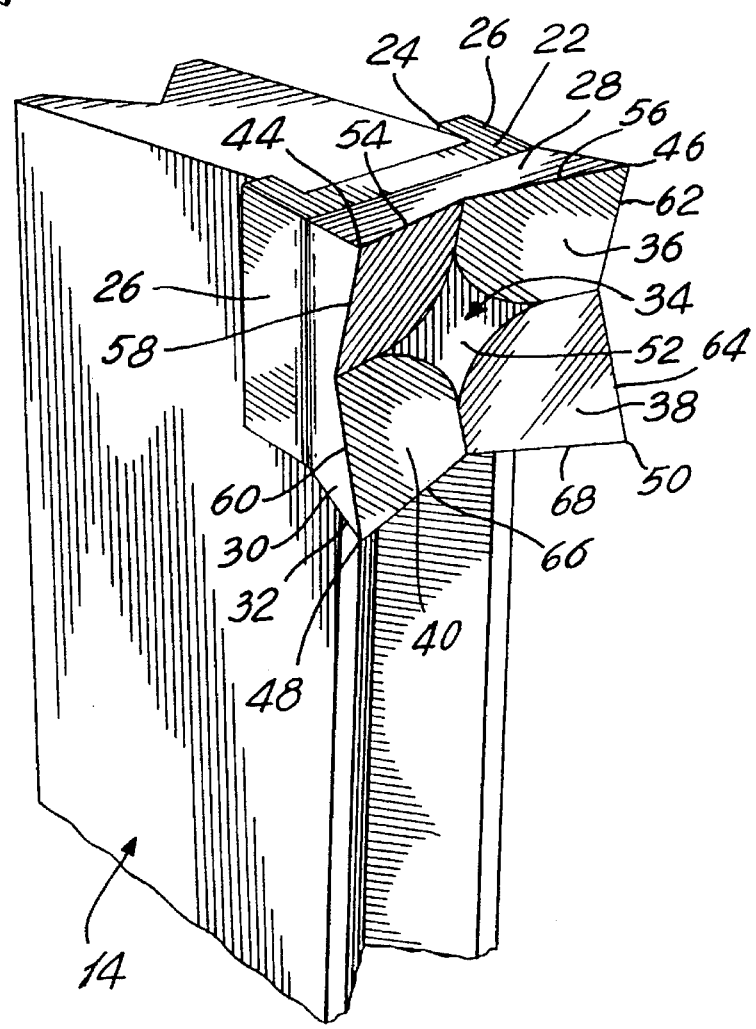
FIG. 3 is a fragmentary perspective view of a replacement tooth in accordance with the present invention.

The tooth head 16, as shown in FIGS. 3 and 5, includes a mounting base portion 22 defining a channel 24 with side walls 26. The front part of the tooth head 16 includes flared or divergent top wall 28, side walls 30, and a bottom wall 32. The channel 24 of the mounting base 22 of tooth head 16 fits on the shank 14 and is brazed thereto or otherwise fixed to the shank. The head has a front attack face 34 including planar quadrant surfaces 36, 38, 40, and 42. The intersection of the side walls 30 and top wall 28 with quadrant surfaces 42 and 36 produces upper cutting tips 44 and 46. Likewise, the intersection of side walls 30 and bottom wall 32 with quadrant surfaces 40 and 38 produce lower cutting tips 48 and 50 respectively. The front attack face 34 includes a recessed central surface 52. The quadrant surfaces angle forwardly and outwardly from the central surface 52, as shown in FIG. 3. The intersection of the quadrant surfaces 42 and 36 with the top wall produces a cutting edge with cutting edge portions 54 and 56. The intersection of quadrant surfaces 42 and 40 with the left-hand side wall 30 produces a cutting edge with cutting edge portions 58 and 60 while the opposite or right-hand side wall 30 intersecting with quadrants 36 and 38 produces a cutting edge with cutting edge portions edges 62 and 64. Finally, the bottom wall 32 intersects with quadrant surfaces 40 and 38 to produce a lower cutting edge with cutting edge portions 66 and 68.

Since the top wall 28, side walls 30, and bottom wall 32 are flat planar surfaces but are intersected by quadrant surfaces 36, 38, 40, and 42 in the front face 34, the cutting edges produced form shallow Vs at every side, top, and bottom edge. Since the walls 28, 30, and 32 are flared, these V-shaped edges appear to be somewhat recessed, as shown in FIG. 5. Thus, the cutting tips 44, 46, 48, and 50 protrude forwardly and laterally from the tooth. These cutting tips and the cutting edges are spaced apart in the lateral direction a distance much greater than the width of the base 22 of the tooth 16 or, in fact, the width of the shank 14 as is well illustrated in FIG. 5.

Figure 4:
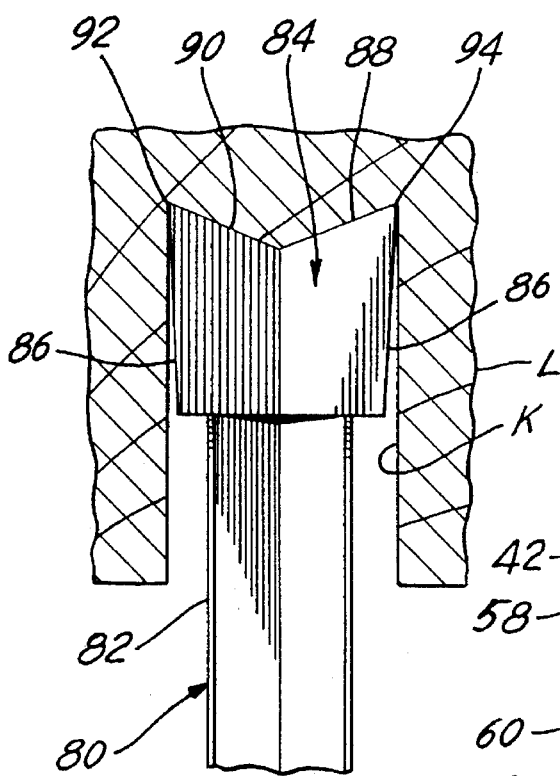
FIG. 4 is a front elevation of a replacement tooth in accordance with the prior art and as shown in FIG. 2.

The tooth 80 of the prior art includes a shank 82 and a tooth head 84. The side surfaces of the tooth 84, namely, surfaces 86, are divergent and flared upwardly as well as laterally. Top surfaces 88 and 90 intersect centrally to form a shallow V along the top surface thereof, thus producing the cutting tips 92 and 94 which protrude laterally and upwardly and are spaced apart a distance greater than the width of the tooth head 84 or the shank 82. The front face 96 is V-shaped and recessed, as shown in FIGS. 1 and 4. However, when the tips 92 and 94 are worn from cutting through wood, the lateral dimension of the tooth in the area of the tips 92 and 94 is reduced, thereby presenting more and more side surface of the tooth to the walls of the kerf illustrated by the letter K in a log L. When the tips 92 and 94 are sufficiently worn, the tooth must be replaced because the side wall 86 will generate sufficient friction with the kerf walls to increase the horsepower necessary to drive the rotary saw.

Looking at the tooth head 16 in FIG. 5, it will be realized that even when the top cutting tips 44 and 46 which do most of the cutting of the fibers to produce the kerf K are worn, the tips 48 and 50, which are below tips 44 and 46, will continue to slash the side walls of the kerf K to maintain a wide kerf. Thus, not only must the tips 44 and 46 be worn down before the tooth 12 must be changed, but also the cutting tips 48 and 50, thereby greatly increasing the life of the tooth 12. It will be understood by those skilled in the art that even though the tips 44 and 46 might have worn, they will still cut the fibers to produce a kerf albeit a narrower kerf than would be satisfactory. However, the tips 48 and 50 as well as adjacent cutting edge portions 60 and 64 will slash the side walls of the kerf to widen the kerf without significantly increasing the friction of the tooth in the kerf.

Tooth head 16 may also be rotated 180° so that the tips 48 and 50 are presented as the cutting tips. In such an embodiment, the tooth head 16 is knocked off of shank 14, rotated and brazed back onto the shank 14.

I claim:

1. A slasher saw blade assembly comprising a rotary saw blade including a circular disc and a plurality of slasher teeth, each tooth comprising a shank mounted to the circular disc and extending radially beyond the periphery of the circular disc, each tooth including a saw tooth head fixed to said shank outside the periphery of said circular disc, each saw tooth head having a width greater than the width of said circular disc and said shank and including a front attack face oriented in a direction of rotation of said circular saw disc, said saw tooth head including a top surface farthest from the circular disc, opposed side surfaces intersecting with said top surface and a bottom surface intersecting with said side surfaces, these surface defining with said front attack face top, side and bottom cutting edges, respectively, on said head; the top, side and bottom surfaces diverging away from one another as they extend forwardly towards said front attack face in the direction of rotation of said circular saw disc; the front attack face being recessed in a rearward direction from said cutting edges and comprising flat quadrant surfaces extending outwardly and forwardly from the center of said front attack face to said cutting edges; the intersection of said top and side cutting edges forming a pair of spaced-apart upper cutting tips, the distance between which being greater than the width of said shank and circular saw disc; the intersection between the side and bottom cutting edges defining a pair of spaced-apart lower cutting tips, the distance between which being greater than the width of said shank and circular saw disc; each of said cutting edges being formed by cutting edge portions; each flat quadrant surface including one of said cutting tips and a pair of said cutting edge portions extending therefrom, one each from adjacent cutting edges; each of said pairs of said cutting edge portions diverging rearwardly from their respective cutting tip to define shallow, V-shaped cutting edges that extend between each of said pair of tips; said cutting edges being coincident with the top, side and bottom surfaces of said saw tooth head whereby both the upper and lower cutting tips and edge therebetween progressively sever wooden fibers during a slashing operation forming a kerf and providing an increased cutting-use span to said slasher saw blade assembly.

2. The slasher saw blade assembly as claimed in claim 1, in which each of said saw tooth heads includes a rear mounting base portion having a channel in which its respective shank is mounted, and means for securing each of said saw tooth heads to its respective shank, said saw tooth heads, when worn, being demountable and invertible 180° for remounting whereby the upper and lower cutting tips and respective cutting edges are reversed and an extended slash life is obtained for the slasher saw blade assembly.

* * * * *